3,170,956
METHOD FOR PRODUCING N-SUBSTITUTED NAPHTHYLAMINES
John F. Olin, Dayton, Ohio, assignor to Monsanto Company, a corporation of Delaware
No Drawing. Filed Nov. 13, 1959, Ser. No. 852,632
5 Claims. (Cl. 260—576)

This invention relates to N-substituted derivatives of naphthylamines. More particularly, this invention relates to the condensation of an amine with a naphthol. This invention especially contemplates the preparation of the N-substituted naphthylamines.

There are several processes known for reacting a naphthol with aniline to form an N-phenyl-naphthylamine, which are generally very useful as antioxidants in synthetic rubber. In one known process, the reaction is catalyzed by sulfur dioxide and in another known process ammonium sulfite is used as a catalyst. There is a need for a process for conducting this reaction in a simple manner wherein high yields of the desired product are obtained in a reaction effluent from which the product can be readily separated.

An object of this invention is to provide an improved process for reacting a naphthol with aniline to form an N-phenyl-naphthylamine.

Another object of this invention is to provide a condensation process for producing N-substituted naphthylamines using a finely divided solid catalyst from which the reaction effluent can be readily separated and the N-substituted products readily recovered.

Other aspects, objects and advantages of this invention will be apparent from a consideration of the accompanying disclosure and the appended claims.

In accordance with this invention, naphthols are reacted with a primary amine in the presence of a silica-alumina type catalyst at an elevated temperature to form an N-substituted naphthylamine in high yield, as illustrated by the following equation:

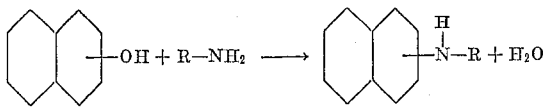

wherein R is selected from the group consisting of alkyl, aryl, and alkaryl radicals. The reaction effluent produced in this invention is readily separated from the finely divided solid catalyst by filtration or by any of the other well known processes for separating finely divided solids from fluids. The reaction effluent separated from the catalyst contains primarily N-substituted naphthylamines together with unconverted reactants and smaller amounts of side-reaction products. The N-substituted naphthylamines can be readily separated from the other materials in the reaction effluent by any of the well known separation procedures, such as distillation, fractional crystallization, solvent extraction and the like.

The naphthol reactants which are useful in the presently provided process of this invention are the 1- and 2-naphthols wherein the hydroxyl group is attached to the carbon atom in either the 1- or 2-position of the napthalene.

The amine reactants which are useful in the presently provided process are the primary amines having two replaceable hydrogen atoms attached to the nitrogen atom. Useful primary amines include the alkyl amines, aryl amines and alkaryl amines. Preferably, the alkyl amines have from 6 to 8 carbon atoms in the alkyl radicals. These alkyl radicals can be of either straight-chain or branched-chain configuration; however, amines having the amino grouping attached to a tertiary carbon atom are generally not used. Illustrative examples of some alkyl radicals, identified by R in the equation above, include hexyl, 2-ethylhexyl, octyl, isononyl, n-dodecyl, 2-propylheptyl, 5-ethylnonyl, 2-butyloctyl, n-tetradecyl, 2,6,8-trimethylnonyl, and the like. An especially valuable class of alkyl radicals is derived from an olefin monomer, dimer, trimer, tetramer, pentamer and the like, carbon monoxide, and hydrogen according to the "Oxo" process. Such alkyl radicals include the branched-chain tridecyl radicals derived from propylene tetramer of butylene trimer, the branched-chain decyl radicals derived from propylene trimer, the branched-chain hexadecyl radicals derived from propylene pentamer, and the branched-chain nonyl radicals derived from diisobutylene. Aniline is a suitable example of an aryl amine. The alkaryl radicals of the alkaryl amines preferably contain less than 12 carbon atoms which can be of either straight-chain or branched-chain configuration. Alkaryl radicals in which there are two such alkyl groups attached to the benzene ring can also be used. Illustrative examples of some suitable alkaryl amines include 2-, 3-, and 4-methylaniline; 2-, 3-, and 4-isopropylaniline; 2-, 3-, and 4-tert-butylaniline; 2,3-dimethylaniline; 3,5-diethylaniline; 2,5-dibutylaniline; and 2,6-dimethylaniline.

In general, the condensation process of this invention is carried out at a temperature above 175° C. and below 255° C.; however, temperatures outside this range may be used depending upon the nature of the amine reactant. The optimum temperature to be used can be determined by one skilled in the art by the amount of catalyst employed, the activity of the catalyst, the nature of the particular reactants, and the pressure selected.

The condensation process of this invention can be carried out at atmospheric pressure if desired. However, superatmospheric pressures are very often employed with some reactants, particularly the primary amines having low boiling points, where superatmospheric pressures must be used in order to secure the necessary temperature. Also, superatmospheric pressures are very often used in order to obtain high yields of the desired product in a reasonable short reaction time. Although pressures less than 500 p.s.i.g. are ordinarily used, pressures as high as 10,000 p.s.i.g. or higher can be used without detrimental effect.

The amounts of naphthol and primary amines used are, in general, not critical at a temperature within the optimum temperature range. Ordinarily, the best yields of the N-substituted naphthylamines are obtained when using a slight excess of the primary amine reactants. Preferably, the amount of primary amine reactant is less than 2 moles of amine per mole of naphthol; however, a greater excess of primary amine reactant can be used if desired. Preferably, an excess of the naphthol reactant is not used because the unconverted reactant is not readily separated from the product in the reactant effluent.

The time of reaction does not appear to be critical so long as the period of time is sufficient to permit the production of the N-substituted naphthylamine in high yields. In general, the reaction time must be at least 2 hours in duration and can be as long as 100 hours, depending upon the temperature, the amount of catalyst used, the quantity of reactants, and the like. The optimum reaction time can be readily determined by one skilled in the art.

The amount of catalyst used is dependent upon the activity of the catalyst, the particular reactants used, and the temperature at which the condensation reaction is carried out. At higher temperatures, somewhat smaller amounts of catalyst can be used than are used at lower temperatures. Also, smaller amounts of highly active catalyst can be used than an amount of catalyst of average or lower activity. Generally, the amount of catalyst used should be between 10% and 200% by weight of the amount of the naphthol reactant. Preferably, the catalyst amounts to 20% by weight of the amount of the naphthol reactant.

The catalysts employed in the process of this invention can be any of the well known silica-alumina type catalysts. The catalyst can be either a naturally-occurring clay or a synthetically prepared catalyst such as described, for example, in U.S. 2,448,160. Naturally-occurring clays are preferred from the economic viewpoint; however, synthetically prepared catalysts are equally effective. Examples of naturally-occurring catalysts which can be used include fuller's earth, Florida earth, Japanese clay, and Gumbrin. Retrol, KSF, KSFO, and Tonsil are some commercially available natural catalysts which are preferably employed in the process of this invention. Retrol catalyst contains, on a volatile-free basis, approximately 71% silica, 17% alumina, 3.9% iron oxide, and 3.2% magnesium oxide, together with minor amounts of potassium and titanium. The Retrol catalyst also contains free moisture amounting to approximately 15.0% by weight and free and combined moisture amounting to 21% by weight of the catalyst. The removal of the free water at a temperature in the range of from 100–200° C. enhances the activity of the catalyst but the removal of the combined water at a temperature of 1700° F. tends to inactivate the catalyst. Retrol is an acid-activated catalyst having an acidity equivalent to 10.0 mg. KOH per gram and the activity of the catalyst can be further increased by treating the catalyst with acid, particularly hydrochloric acid. The acidity of the catalyst can also be neutralized without adversely affecting the activity of the catalyst. The synthetic catalyst, which can be prepared by impregnation, by co-precipitation, or by any other well known method for preparing such catalysts, can also be activated by treatment with mineral acids.

In a preferred embodiment of this invention, a hydrocarbon entrainer or azetrope former is used in the process of this invention to facilitate removal of the water formed in the condensation reaction. An azeotrope former is usually employed if the amine reactant is substantially soluble in water; however, an azeotrope former is not necessary with all reactants. In general, the azeotrope former can be any organic compound which forms an azeotrope with water. Examples of some suitable azeotrope formers include benzene, toluene, xylene, and dibutyl ether. The amount of azeotrope former present in the reaction zone can be varied over wide limits, but the amount is preferably kept within the range of from 25% to 200% by weight of the amount of the naphthol reactant.

The process of this invention can be carried out either batchwise or in a continuous manner, as desired. In a batch type process, the reactants and catalysts are ordinarily refluxed under a water trap so that the water liberated in the reaction can be collected therein. Completion of the reaction can be readily determined by measurement of the amount of water collected in the water trap. After completion of the reaction, the catalyst is separated from the reaction mixture by one of the usual methods for separating solids from fluids. The clear reaction mixture is then topped to remove unconverted amine reactant. The residue, which is the N-substituted naphthylamine, either is permitted to solidify or is crystallized from a hydrocarbon solvent such as hexane and recovered by filtration.

Illustrative examples of some of the N-substituted naphthylamines produced in the process of this invention include the following:

N-phenyl-2-naphthylamine
N-hexyl-1-naphthylamine
N-isodecyl-2-naphthylamine
N-tridecyl-1-naphthylamine
N-hexadecyl-2-naphthylamine
N-(2-propylheptyl)-2-naphthylamine
N-(2-methylphenyl)-2-naphthylamine
N-(4-propylphenyl)-1-naphthylamine
N-(4-tert-butylphenyl)-2-naphthylamine
N-(2,3-dimethylphenyl)-2-naphthylamine
N-(2,6-diisopropylphenyl)-1-naphthylamine The N-substituted naphthylamines are very stable to the effects of air and light, and therefore, possess good color stability when used as additives in other materials. These compounds are very useful as antioxidants or stabilizers for petroleum products and polymeric materials, particularly synthetic rubber.

The advantages, desirability and usefulness of the present invention are well illustrated by the following examples:

*Example 1*

In this example, N-(4-tert-butylphenyl)-2-naphthylamine was prepared by condensing 144 g. (1 mole) of 2-naphthol with 164 g. (1.1 mole) of 4-tert-butylaniline, using 32 g. of Retrol catalysts and 100 g. of tetralin as an azeotrope former. The reactants were heated in a reaction flask with agitation under a water trap for a short period of time at a temperature of 200° C. to dehydrate the system. Thereafter, the reactants were heated at a temperature of 210° C. for a period of 12 hours with the liberation of 18 ml. of water which was collected in the water trap. At the end of this time, the reaction mixture was cooled to 100° C. and filtered to effect removal of the catalyst, which was washed with toluene. The filtrate, including the wash liquor, was topped at a pot temperature of 240° C. at 15 mm. to remove unconverted 4-tert-butylaniline. Since the residue from the topping step did not appear to crystallize well on standing, 400 ml. of hexane was added to the residue. Upon standing overnight, by-product N-phenyl-2-naphthylamine crystallized out of solution. It was separated by filtration and the filtrate distilled to obtain a fraction boiling at 185° C./0.05 mm. This fraction was then diluted with hexane and permitted to cool to room temperature. Upon cooling, the N-(4-tert-butylphenyl)-2-naphthylamine crystallized out and was recovered by filtration. The melting point of the product was found to be 75–80° C.

*Example 2*

In this example, N-phenyl-2-naphthylamine was prepared by condensing 144 g. (1 mole) of 2-naphthol with 140 g. (1.5 moles) of aniline using 30 g. of Retrol clay as catalyst. The reactants and catalyst were placed in a reaction flask which was refluxed under a water trap which was filled with xylene. In raising the temperature of the reaction flask to 185° C., 4.5 ml. of water was collected in the water trap and discarded. The heating was then continued for a period of 6 hours while maintaining the temperature in the range of 195–210° C. to liberate 18 ml. of water which was collected in the water trap. At the end of this time, the reaction mixture was permitted to cool to 135° C., at which temperature it was filtered to remove the catalyst. The catalyst was washed with hot toluene and the filtrate and wash liquor vacuum distilled to 180° C./15 mm. to remove unconverted aniline. The residue from the vacuum distillation was poured onto an aluminum sheet and permitted to solidify. The product, N-phenyl-2-naphthylamine, amounted to 216 g. and was pinkish-brown in color. It had a melting point of 104–108° C. The yield was 98.5%.

Reasonable variation and modification of the invention as described are possible, the essence of which is that there have been provided improved methods for preparing the N-substituted naphthylamines from naphthols and primary amines using finely divided solid catalyst.

I claim:
1. In a method for making N-substituted naphthylamines of the formula R—$NH_2$ wherein R is selected from the group consisting of alkyl, alkylphenyl and phenyl radicals by reacting naphthol with a primary amine, the improvement comprising carrying out the reaction at a temperature in the range of 175–275° C. in the presence of an acid-activated silica-alumina catalyst and continuously removing the water of reaction in the form of an azeotrope.

2. A method of claim 1 wherein said amine is a primary alkyl amine having from six to eight carbon atoms in the alkyl radical.

3. A method of claim 1 wherein said amine is a primary phenyl amine.

4. A method of claim 1 wherein said naphthol is 2-naphthol and said amine is aniline.

5. A method of claim 1 wherein said naphthol is 2-naphthol and said amine is 4-tert-butylaniline.

References Cited in the file of this patent

UNITED STATES PATENTS

| | | |
|---|---|---|
| 1,449,423 | Lowry et al. | Nov. 27, 1923 |
| 2,013,873 | Vogt | Sept. 10, 1935 |
| 3,055,940 | Merz | Sept. 25, 1962 |

FOREIGN PATENTS

| | | |
|---|---|---|
| 448,125 | Great Britain | June 2, 1936 |

OTHER REFERENCES

Howald et al.: "Ind. and Eng. Chem.," vol. 15, pages 397 to 401 (1923).

Stevenson: "Ind. and Eng. Chem." vol. 40, page 1587 (1948).

Adams et al.: "Organic Reactions," vol. 1, pages 111–112 (1942).

UNITED STATES PATENT OFFICE
CERTIFICATE OF CORRECTION

Patent No. 3,170,956　　　　　　　　　　　　February 23, 1965

John F. Olin

It is hereby certified that error appears in the above numbered patent requiring correction and that the said Letters Patent should read as corrected below.

Column 2, line 45, for "reasonable" read -- reasonably --; column 3, line 48, for "azetrope" read -- azeotrope --; column 5, lines 8 to 10, strike out "of the formula $R-NH_2$ wherein R is selected from the group consisting of alkyl, alkylphenyl and phenyl radicals" and insert the same after "amine" in line 10, same column 5.

Signed and sealed this 20th day of July 1965.

(SEAL)
Attest:

ERNEST W. SWIDER　　　　　　　　　　　EDWARD J. BRENNER
Attesting Officer　　　　　　　　　　　　Commissioner of Patents